(12) United States Patent
Wakasa

(10) Patent No.: US 9,613,302 B2
(45) Date of Patent: Apr. 4, 2017

(54) RECORDING DEVICE AND METHOD OF CONTROLLING THE SAME

(71) Applicant: Seiko Epson Corporation, Tokyo (JP)

(72) Inventor: Shunichi Wakasa, Chikuma (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/832,627

(22) Filed: Mar. 15, 2013

(65) Prior Publication Data

US 2013/0250323 A1 Sep. 26, 2013

(30) Foreign Application Priority Data

Mar. 26, 2012 (JP) ................................ 2012-069210
Mar. 30, 2012 (JP) ................................ 2012-079660

(51) Int. Cl.
*G06K 15/02* (2006.01)
*G06K 15/00* (2006.01)

(52) U.S. Cl.
CPC ..... *G06K 15/1827* (2013.01); *G06K 15/1809* (2013.01); *G06K 15/402* (2013.01)

(58) Field of Classification Search
CPC ........... G06K 15/1827; G06K 15/1809; G06K 15/402
USPC ...................................... 358/1.13, 1.15–1.16
See application file for complete search history.

(56) References Cited

U.S. PATENT DOCUMENTS 5,050,098 A * 9/1991 Brown et al. ................. 358/1.13
6,067,553 A * 5/2000 Downs .................. G06F 17/211
  358/1.18
6,246,485 B1 * 6/2001 Brown et al. ................. 358/1.13
8,587,792 B2 * 11/2013 Kasamatsu ........ H04N 1/00307
  358/1.13
2005/0198566 A1 9/2005 Takamine et al.
2008/0066057 A1 * 3/2008 Aoyama ............... G06F 9/4448
  717/124
2008/0291206 A1 * 11/2008 Uchimura .............. H04N 5/278
  345/467
2009/0109487 A1 * 4/2009 Tsukada ....................... 358/1.16
2010/0014104 A1 * 1/2010 Soord ............................ 358/1.9
2010/0118330 A1 * 5/2010 Feijoo et al. ................. 358/1.15
2010/0214589 A1 8/2010 Fukano et al.
2010/0328694 A1 * 12/2010 Horiuchi et al. ............. 358/1.11
2011/0063671 A1 3/2011 Akahane
2011/0122438 A1 * 5/2011 Someya ................ G06F 3/1208
  358/1.15
2011/0310432 A1 12/2011 Waki (Continued)

FOREIGN PATENT DOCUMENTS

EP     0 397 111 A2    11/1990
JP     03-073374 A      3/1991

(Continued)

*Primary Examiner* — Jerome Grant, II
(74) *Attorney, Agent, or Firm* — Nutter McClennen & Fish LLP; John J. Penny, Jr.; Alex Nagorniy

(57) ABSTRACT

Queries from a control device are answered based on the data actually used. When a control command is received from a host computer, the recording control unit of a printer changes a value related to the recordable area stored in a temporary storage area according to the content of the control command, uses the new value to record in the recordable area, and returns the new value when queried by the host computer about the setting for which the value was changed.

11 Claims, 9 Drawing Sheets

(56) References Cited

U.S. PATENT DOCUMENTS

2012/0203956 A1* 8/2012 Wakasa .................. 711/103
2014/0376012 A1 12/2014 Akahane

FOREIGN PATENT DOCUMENTS

| | | |
|---|---|---|
| JP | 07-195741 A | 8/1995 |
| JP | 10-305642 A | 11/1998 |
| JP | 2001-266259 A | 9/2001 |
| JP | 2004-046625 A | 2/2004 |
| JP | 2005-324445 A | 11/2005 |
| JP | 2006-285476 A | 10/2006 |
| JP | 2006-343840 A | 12/2006 |
| JP | 2007-102497 A | 4/2007 |
| JP | 2008-203926 A | 9/2008 |
| JP | 2008-299487 A | 12/2008 |
| JP | 2010-122809 A | 6/2010 |
| JP | 2011-062835 A | 3/2011 |
| JP | 2012-003627 A | 1/2012 |
| WO | 03/085509 A1 | 10/2003 |

* cited by examiner

| FONT NAME | SIZE (W x H dots) |
|---|---|
| FONT A | 12 x 24 |
| FONT A' | 13 x 26 |

FIG. 2A

| RECORDABLE AREA |
|---|
| 400 DOTS |

FIG. 2B

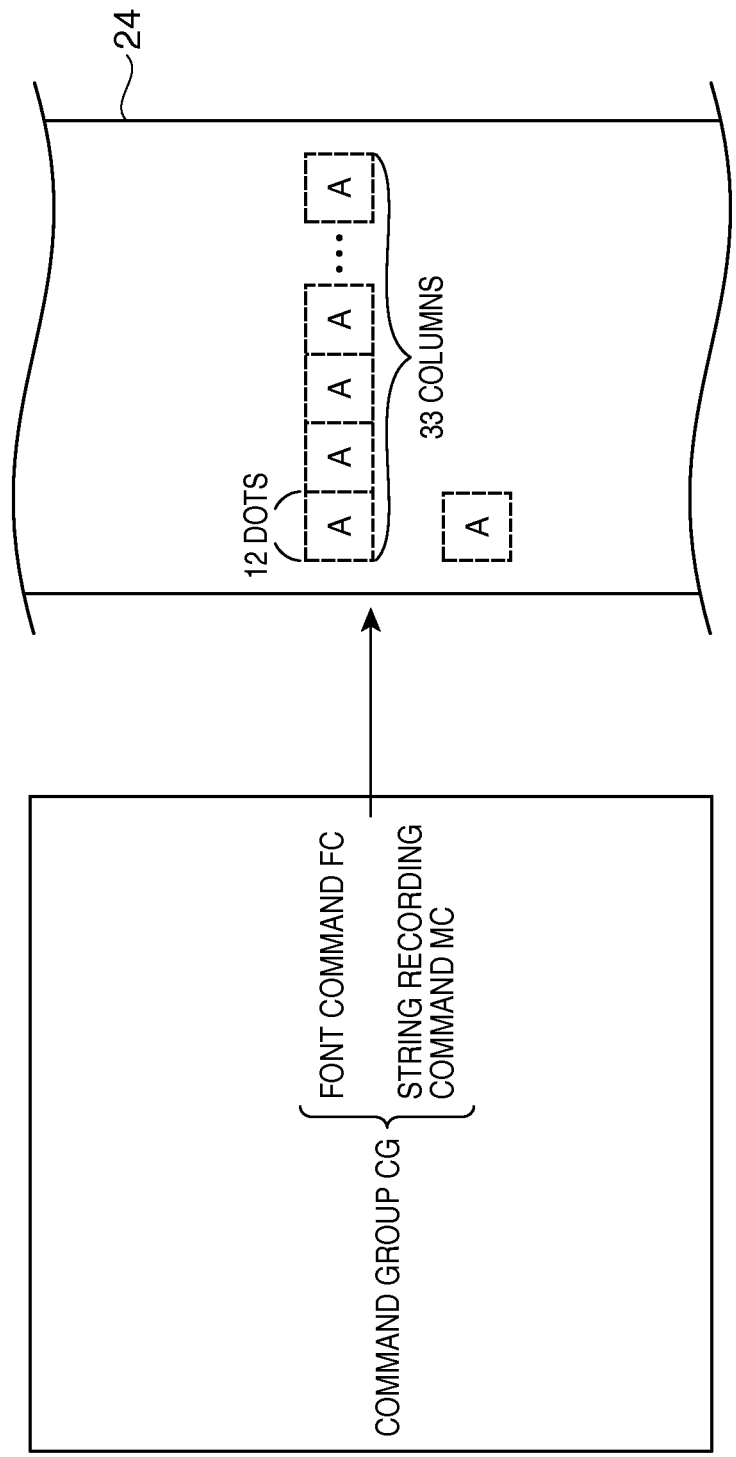

RECORDING DEVICE AND METHOD OF CONTROLLING THE SAME

BACKGROUND

Priority is claimed under 35 U.S.C. §119 from Japanese patent application nos. JP 2012-069210 filed on Mar. 26, 2012 and JP 2012-079660 filed on Mar. 30, 2012, which are hereby incorporated by reference in their entirety.

1. Technical Field

The present invention relates to a recording device that can connect to a control device, and to a method of controlling the recording device.

2. Related Art

Recording devices (print control devices) that store the values for various recording-related settings, and execute recording-related operations while referring to these settings, are known from the literature. See, for example, Japanese Unexamined Patent Appl. Pub. JP-A-2008-203926. Control devices (such as host computers) that control such recording devices generally have a function for querying the recording device about these settings.

Recording devices (serial printers) that store font data and can record characters (text) based on the font data are also known from the literature. See, for example, Japanese Unexamined Patent Appl. Pub. JP-A-H07-195741. Some printers of this type also have a function for responding to queries related to the code pages that store the font data that are received from the host computer or other control device.

These print (recording) settings include settings that are temporarily changed in order to record in a specific manner when the recording device prints. There is also a need for a recording device that can respond appropriately reflecting the temporary change in the setting when queried about a setting by the control device.

Because the font data is used to record text, the response should be based on the content of the font data that is actually used when a query related to the font data is received from the control device. For example, when a temporary change is made to the font data, the recording device should respond to queries from the control device based on the font data reflecting the temporary change.

SUMMARY

The present invention is directed to solving the foregoing problem, and enables responding appropriately to queries about settings from the control device even when there is a setting that has been temporarily changed for recording.

Another aspect of the invention is a recording device that can respond appropriately based on the code page as actually used when queried by the control device about a code page that stores font data.

One aspect of the invention is a recording device that can connect to a control device and comprises a storage unit that stores data; wherein the recording device stores data stored in the storage unit to a temporary storage area, and when queried by the control device about data stored in the storage unit, responds to the query based on data that was changed and stored in the temporary storage area.

This aspect of the invention can respond appropriately to queries from the control device based on the data actually used.

In a recording device according to another aspect of the invention, the storage unit stores configuration data containing a value for a setting related to recording on a recording medium; and a recording control unit stores the value contained in the configuration data to the temporary storage area, records on the recording medium based on a control command received from the control device while referencing the value stored in the temporary storage area, changes a value related to a specific setting stored in the temporary storage area based on content of the control command when the control command is received from the control device, records while referencing the new value for the specific setting, and returns the new value when queried by the control device about the setting for which the value was changed.

When a query about a setting for which the value was temporarily changed is received from the control device, this aspect of the invention returns the changed (new) value stored in the temporary storage area, and not the value written in the configuration data. Because the value stored in the temporary storage area is the value that is actually used in the recording process, the recording device according to this aspect of the invention can appropriately return the value that is actually used for recording for any setting that was temporarily changed when queried about a setting by the control device and the value of the setting has been temporarily changed for recording.

In a recording device according to another aspect of the invention, the configuration data contains a value related to a recordable area; and the recording control unit changes the value related to the recordable area stored in the temporary storage area based on content of the control command when a control command is received from the control device, records in the recordable area while referencing the new value for the recordable area, and returns the new value related to the recordable area when queried about the recordable area by the control device.

In order to achieve a specific result when recording, the recording device may increase or decrease the value of a setting of the recordable area contained in the configuration data. When a setting of the recordable area has been temporarily changed, and a query about the recordable area is received from the control device, the recording device in this aspect of the invention responds with the value of the temporary setting for the recordable area, and can therefore appropriately return the value of the recordable area setting that is actually used when recording.

In a recording device according to another aspect of the invention, the recording control unit changes a value related to the recordable area stored in the temporary storage area so that the recordable column count of characters recorded on one line is a specific value based on content of the control command when a control command instructing recording one line of characters is received from the control device, records in the recordable area while referencing the new value for the recordable area, and returns the new value related to the recordable area when queried about the recordable area by the control device.

The recording result (the appearance of the recording medium when recording is completed) may change greatly depending upon the recordable column count of characters recorded on one line. The recording device may therefore adjust the recordable column count of characters recorded on one line by changing a setting of the recordable area. When a setting of the recordable area is temporarily changed in order to adjust the recordable column count, and a query about the recordable area is then received from the control device, the recording device in this aspect of the invention returns the value of the temporary setting for the recordable area, and can therefore appropriately return the value of the recordable area setting that is actually used when recording.

In a recording device according to another aspect of the invention, the storage unit also stores font data; and the recording control unit changes a value related to the recordable area stored in the temporary storage area so that the recordable column count when the characters are recorded on one line in the specific font, and the recordable column count when the characters are recorded on one line in another specific font, are the same based on content of the control command when a control command instructing recording one line of characters in a specific font is received from the control device, records in the recordable area while referencing the new value for the recordable area, and returns the new value related to the recordable area when queried about the recordable area by the control device.

In order to achieve substantially the same recording result (printout) when recording one line of characters in one specific font or a different specific font, the recording device according to this aspect of the invention may temporarily change a setting of the recordable area so that the recordable column count when characters are recorded on one line in the one specific font and the recordable column count when the characters are recorded on one line in the different specific font are the same. When a setting of the recordable area is temporarily changed in order to adjust the recordable column count, and a query about the recordable area is received from the control device, the recording device in this aspect of the invention returns the value of the temporarily changed setting of the recordable area, and can therefore respond appropriately with the value of the recordable area setting that is actually used for recording.

In a recording device according to another aspect of the invention, the storage unit stores a code page storing initialization command data containing one or a plurality of initialization commands for executing initialization processes, and font data; the initialization commands include a destination command that writes the code page to the temporary storage area, and changes content of the code page to content for a specific destination; and a process execution unit sequentially executes the initialization commands based on the initialization command data stored in the storage unit after the power is turned on or a reset is commanded, and when queried by the control device about the code page, responds to the query based on the content that was changed for the specific destination in the code page written to the temporary storage area.

When the power turns on or a reset is forced, this aspect of the invention writes the code page to a temporary storage area after changing the content of the code page for the market destination. As a result, different characters can be recorded using a code page with content that has been appropriately changed for the intended market. When a query related to the code page is then received from the control device, the recording device in this aspect of the invention responds to the query based on the changed content of the code page written to the temporary storage area, that is, based on the content of the code page actually used, and can therefore respond appropriately based on the code page as it is used.

In a recording device according to another aspect of the invention, the destination command contains an instruction that changes specific font data in the font data stored in the code page to font data for a specific destination; and the process execution unit, when queried by the control device about the specific font data, responds to the query based on the new content of the font data that was changed for the specific destination.

When queried about specific font data, the recording device in this aspect of the invention responds based on the font data after the font data is changed for the destination in the initialization process, and can therefore respond appropriately based on the content of the font data that is actually used.

In a recording device according to another aspect of the invention, the initialization command data includes a data part where data identifying each initialization command is written consecutively in the command execution order in a specific storage area in the storage unit, and an information part including information indicating the size of the data in the storage area.

The initialization command data could conceivably be stored in a relational database to simplify managing the initialization commands written in the initialization command data. However, this configuration also requires storing information for managing the relational database (such as the address of each field in the storage area, and information about the relationships between the data stored in each field), unnecessarily requires providing a corresponding storage area, and thus creates problems with efficient use of nonvolatile memory.

Because data identifying the initialization commands is written continuously in the order the commands are executed in the data part of the initialization command data, the storage area occupied by the data part is minimized and there is no need to store information for managing the order in which the commands are executed. In addition, the information part of the initialization command data stores the smallest amount of information required to identify the area where the data part is stored in the storage area, that is, stores information indicating the size of the data part. The size of the information part is therefore small, and the nonvolatile memory can be used efficiently.

Another aspect of the invention is a control method of a recording device that can connect to a control device and has a storage unit that stores data, the control method comprising: storing data stored in the storage unit to a temporary storage area; and when queried by the control device about data stored in the storage unit, responding to the query based on data that was changed and stored in the temporary storage area.

This configuration enables respond appropriately to control device queries based on the data actually used.

Another aspect of the invention is a control method of a recording device wherein: the storage unit stores configuration data containing a value for a setting related to recording on a recording medium; and the control method includes storing the value contained in the configuration data to the temporary storage area; recording on the recording medium based on a control command received from the control device while referencing the value stored in the temporary storage area; changing a value related to a specific setting stored in the temporary storage area based on content of the control command when the control command is received from the control device; recording while referencing the new value for the specific setting; and returning the new value when queried by the control device about the setting for which the value was changed.

The control method according to this aspect of the invention enables the recording device to appropriately return the value that is actually used for recording for any setting that was temporarily changed when queried about a setting by the control device and the value of the setting has been temporarily changed for recording.

Another aspect of the invention is a control method of a recording device wherein: the storage unit stores a code page storing initialization command data containing one or a plurality of initialization commands for executing initialization processes, and font data; the initialization commands include a destination command that writes the code page to the temporary storage area, and changes content of the code page to content for a specific destination; and the control method further includes sequentially executing the initialization commands based on the initialization command data stored in the storage unit after the power is turned on or a reset is commanded, and when queried by the control device about the code page, responding to the query based on the content that was changed for the specific destination in the code page written to the temporary storage area.

When a query related to the code page is received from the control device, the control method according to this aspect of the invention enables the recording device to respond to the query based on the changed content of the code page written to the temporary storage area, that is, based on the content of the code page actually used, and therefore respond appropriately based on the code page as it is used.

EFFECT OF THE INVENTION

The invention enables responding appropriately based on the data that is actually used to queries from a control device. For example, when a query related to settings is received from the control device, the value of a setting that was temporarily changed for recording can be desirably returned. When a query related to a code page that stores font data is received from the control device, the query can be answered based on the data in the code page that is actually used.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 2A shows font size data.

FIG. 2B shows the content of setting data.

FIG. 3A shows an example of a control command.

FIG. 3B shows an example of the result of recording based on the control command.

DESCRIPTION OF EMBODIMENTS

Preferred embodiments of the present invention are described below with reference to the accompanying figures.

Embodiment 1

Figure 1:
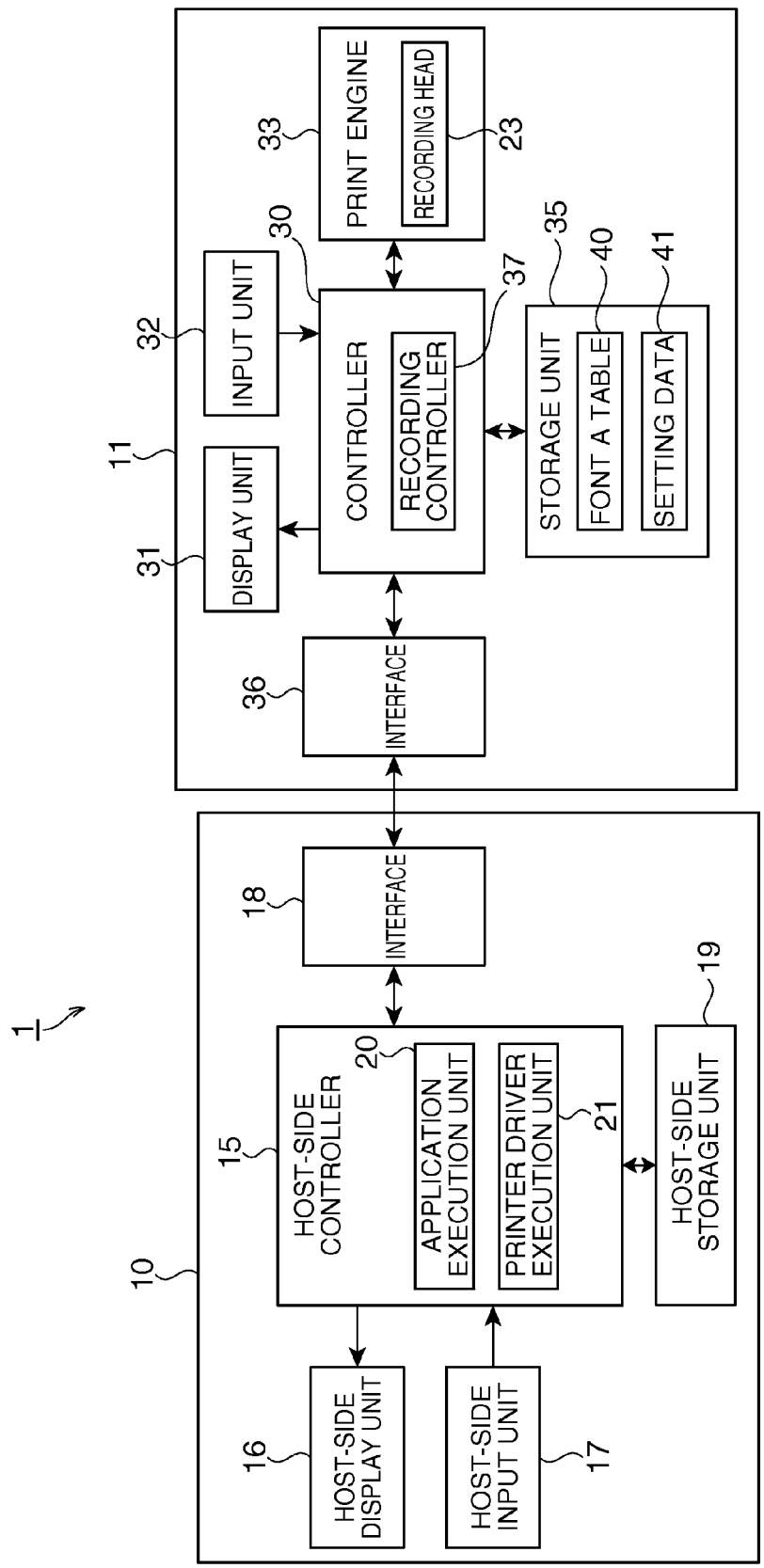
FIG. 1 is a block diagram showing the functional configuration of a recording system according to a first embodiment of the invention.

FIG. 1 is a block diagram showing the functional configuration of a recording system 1 according to a first embodiment of the invention.

The recording system 1 includes a host computer 10 (control device) and a printer 11 (recording device), and is a system for recording on a recording medium with the printer 11 as controlled by the host computer 10. More specifically, the host computer 10 and printer 11 in the recording system 1 according to this embodiment of the invention work together to print receipts. The operation of the host computer 10 and the printer 11 when producing a receipt is described below.

As shown in recording system 1, the host computer 10 has a host-side controller 15, a host-side display unit 16, a host-side input unit 17, a interface 18, and a host-side storage unit 19.

The host-side controller 15 centrally controls other parts of the host computer 10, and includes a CPU, RAM, ROM, and other peripheral circuits. The host-side controller 15 includes a application execution unit 20 and a printer driver execution unit 21, which are further described below.

The host-side display unit 16 has a display panel such as an LCD panel, and displays information on the display panel as controlled by the host-side controller 15.

The host-side input unit 17 is connected to input devices, detects operation of the input devices, and outputs to the host-side controller 15.

The interface 18 communicates with the printer 11 according to a known communication protocol as controlled by the host-side controller 15.

The host-side storage unit 19 includes a storage device such as a hard disk drive or EEPROM, and stores data rewritably.

The printer 11 is a thermal printer that has a recording head 23 with a row of heat elements and records images by applying heat to the recording surface of the thermal roll paper 24 (recording medium) and forming pixels with the recording head 23. More particularly, the printer 11 can produce receipts by recording specific images on the thermal roll paper 24 and then cutting the thermal roll paper 24 at a specific position.

As shown in FIG. 1, the printer 11 has a controller 30, a display unit 31, an input unit 32, a print engine 33, a storage unit 35, and an interface 36.

The controller 30 has a CPU, RAM, ROM, and other peripheral circuits, and centrally controls other parts of the printer 11. The controller 30 also has a recording controller 37, which is further described below.

The display unit 31 includes a display panel such as an LCD panel that displays information such as the operating state of the printer 11, and LEDs, and displays information on the display panel and drives the LEDs on or off in specific patterns as controlled by the controller 30.

The input unit 32 is connected to operating switches disposed to the printer 11, detects operation of the operating switches, and outputs operating signals to the controller 30.

The print engine 33 includes a conveyance mechanism that conveys the thermal roll paper 24, and a cutting mechanism that cuts the thermal roll paper 24, in addition to the recording head 23.

By reading and running firmware, the recording controller 37 of the controller 30 controls the recording head 23 and motors while monitoring the output of various sensors to record specific images on the thermal roll paper 24 and cut the thermal roll paper 24 at a specific position to produce a receipt, which is a slip on which the specific images are recorded, based on control commands received from the host computer 10. The functions of the recording controller 37 are achieved by the cooperation of hardware and software, such as a CPU reading and running firmware.

The interface 36 communicates with the host computer 10 according to a specific communication protocol as controlled by the controller 30.

The storage unit 35 includes nonvolatile memory such as EEPROM or a hard disk drive, and nonvolatilely records data rewritably. Firmware for controlling printer 11 operation is stored in the storage unit 35. A font A table 40 and setting data 41 are also stored in the storage unit 35, and are further described below.

The basic operation of the recording system 1 when producing a receipt is described next by describing the application execution unit 20 and printer driver execution unit 21.

The application execution unit 20 generates image information data containing information related to the images to be recorded on the receipt, and outputs to the printer driver execution unit 21, by running an application previously installed on the host computer 10.

The printer driver execution unit 21 generates control commands corresponding to the command language of the printer 11 based on the image information data input from the application execution unit 20, and outputs to the printer 11, by running a printer driver previously installed on the host computer 10.

A control command is a group of commands that cause the printer 11 to perform operations related to producing a receipt, and include a command instructing recording an image, a command instructing conveying the thermal roll paper 24 a specific distance, and a command instructing cutting the thermal roll paper 24. The control commands output from the host computer 10 to the printer 11 are sequentially stored in a receive buffer (not shown in the figure). The recording controller 37 of the controller 30 of the printer 11 controls the print engine 33 to execute the operations related to producing a receipt, and produces a receipt, by sequentially reading and executing the control commands stored in the receive buffer.

Recording characters (text) on the thermal roll paper 24 is described next.

FIG. 2A is a table of fonts A and A' and shows the size of each font.

The printer 11 is compatible with font A, which is one type of font, and font A table 40, which is a font table related to font A, is stored in the storage unit 35. A font table is a table storing a set of font data, and the font data is the actual data expressing the characters in a form that can be recorded on the thermal roll paper 24. The font data in this embodiment of the invention is bitmap font data. As shown in FIG. 2A, the font size of font A is 12 dots wide by 24 dots high.

FIG. 2B shows an example of a setting that is related to the invention and contained in the setting data 41 stored in the storage unit 35. The setting data 41 is a data set of values for settings related to recording. The values related to the different settings are specific values for settings and parameters that are used when producing a receipt that includes recording on the thermal roll paper 24. For example, these values include the recording speed (such as a value indicating high, medium, or low speed) when the recording speed is a configurable setting; the recording density when the recording density is a configurable setting; a value denoting the width of the thermal roll paper 24 that is loaded; and values denoting the left and right print margins. In this embodiment the user can write or rewrite the values of the settings in the setting data 41 as desired using the user interface provided by the printer driver installed on the host computer 10.

As shown in FIG. 2B, the printer 11 settings in this embodiment include at least a recordable area setting. The recordable area is the length along the paper width to which images can actually be recorded when recording images on the thermal roll paper 24. In the example shown in FIG. 2B, the setting (value) for the recordable area is 400 dots. As described above, the value related to the size of the recordable area can be set as desired by the user.

The basic operation of the printer 11 when recording a character string is described next.

FIG. 3A shows an example of a control command instructing recording a specific string, and more particularly shows a command group CG that instructs recording the string AAA . . . A (a 34-character long string of the letter A, here and below) using font A. FIG. 3B shows an example of the thermal roll paper 24 after recording the string by executing the command group CG shown in FIG. 3A.

As shown in FIG. 3A, the command group CG includes a font command FC and a string recording command MC.

The font command FC identifies the font used to record the string, and the font command FC in FIG. 3A specifies font A as the font to use when recording the string.

The string recording command MC is a command that instructs recording a string. The string recording command MC contains parameters including the command code, and a string composed of a combination of characters expressed by a specific character code (such as ASCII). The string recording command MC shown in FIG. 3A is in the format XXX"AAA . . . A", for example (where XXX is the command code instructing recording a string, and the string enclosed in quotation marks is a string of characters in ASCII code).

Operation of the printer 11 when recording the string AAA . . . A in font A based on command group CG is described below.

First, the printer driver execution unit 21 of the host computer 10 generates and sends the command group CG to the printer 11. The printer 11 then temporarily stores the control commands contained in the command group CG received from the host computer 10 in the receive buffer.

The recording controller 37 of the controller 30 of the printer 11 then reads the font command FC and string recording command MC stored in the receive buffer. Next, the recording controller 37 sequentially acquires the characters in the string AAA . . . A specified in the string recording command MC, references the font table (font A table 40) for the font (font A) specified by the font command FC, and sequentially converts the acquired characters to font data and writes to a line buffer 45. Next, each character written in ASCII code correlates to font data stored in the font A table 40, and information indicating this correlation is previously stored in the storage unit 35.

Figure 4A:
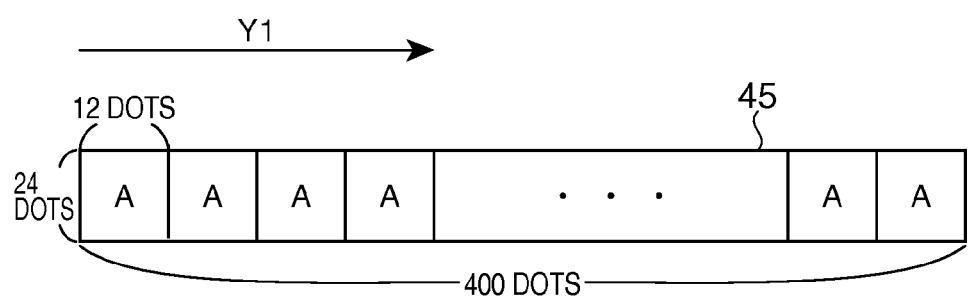
FIG. 4A shows font data written to a line buffer.
Figure 4B:
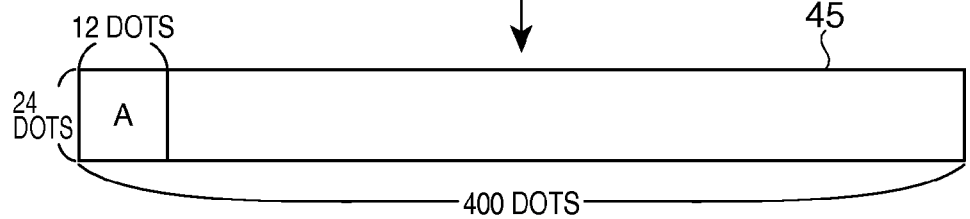
FIG. 4B shows font data written to a line buffer.

FIGS. 4A and 4B show the font data written to the line buffer 45.

The line buffer 45 is a print buffer for one line that is reserved at a specific address in controller 30 RAM. Recording a string is done line by line in this embodiment, and to record one line of text to the thermal roll paper 24, the recording controller 37 first writes the font data for all characters in the string to the line buffer 45, and then records images based on the data written to the line buffer 45.

The operation of writing the font data for font A to the line buffer 45 is described more specifically next.

The recording controller 37 first creates a line buffer 45 400 dots wide by 24 dots high in RAM. The width of the line buffer 45 is determined by the value of the setting related to the recordable area of the printer 11, and the height is determined is determined by the height of the converted font data. Next, as shown in FIG. 4A, the recording controller 37 gets the one character to be processed from the characters in the string AAA . . . A stored in the line buffer 45, converts the acquired character to font data, and writes the converted font data to the line buffer 45. By sequentially repeating this operation of acquisition, conversion, and writing, font data for each character in the string AAA . . . A is sequentially written to the line buffer 45 in the direction of arrow Y1.

When font data for each character in the string AAA . . . A is sequentially written to the line buffer 45, font data for the 34th letter A cannot be written to the line buffer 45 after writing the font data for the 33rd letter A because the width of the line buffer 45 is 400 dots and the width of the font data for font A is 12 dots. When this happens, the recording controller 37 determines that the line buffer 45 is full, and records a string of 33 letters A based on the data written to the line buffer 45. The recording controller 37 then clears the line buffer 45, and sequentially writes font data for the remaining characters from the beginning of the line buffer 45. More specifically, font data for the 34th letter A is written to the line buffer 45 (FIG. 4B). The recording controller 37 then records the 34th letter A based on the font data written to the line buffer 45.

As a result of this operation, the string AAA . . . A is recorded on the thermal roll paper 24 as shown in FIG. 3B based on the command group CG shown in FIG. 3A.

The number of recordable columns (recordable column count) is the number of columns of characters that can be recorded on one line, and is determined by the recordable area setting and the width of the font data of the characters to be recorded. In the above example, the recordable area setting is 400 dots, the width of the character font data is 12 dots, 400/12=33.3 . . . , and the recordable column count is therefore 33 columns. In other words, the recordable column count is the maximum number of characters for which font data can be written to the line buffer 45 formed in RAM. When instructed to record a string containing more characters than the recordable column count, the recording controller 37 in this embodiment of the invention records the recordable column count of characters on one line, executes a line feed, and then records the remaining character(s) by repeating the operation described above.

To record a string with the printer 11, the host computer 10 specifies the font to use with the font command FC as described above. However, the printer 11 may not be compatible with the font specified by the host computer 10 (that is, may not have a resident font table for the specified font). The printer 11 records the string using a font that is stored in the printer 11 in this situation, and the printout resulting from recording the string using the font specified by the host computer 10, and the printout resulting from recording the string with a different font that is stored in the printer 11, is preferably very similar. More specifically, because receipts are given to the customer after being printed, the printout should be similar regardless of whether the specified font is available. To obtain similar results in the printout, at least the recordable column count when recording the string with the font specified by the host computer 10, and the recordable column count when recording the string using a font resident in the printer 11, must be the same. If the recordable column counts differ, strings may return at different positions, or strings may be recorded at different positions on the receipt, and the resulting printouts may differ significantly.

The printer 11 according to this embodiment of the invention therefore operates as described below, and responds appropriately based on the following operation to setting-related queries from the host computer 10.

When the host computer 10 commands recording a string using font A', that is, outputs a command group CG containing a font command FC specifying font A' and a string recording command MC to the printer 11, the printer 11 operates as described below. Note that as shown in FIG. 2A the size of font A' is 13 dots wide by 26 dots high.

Figure 5:
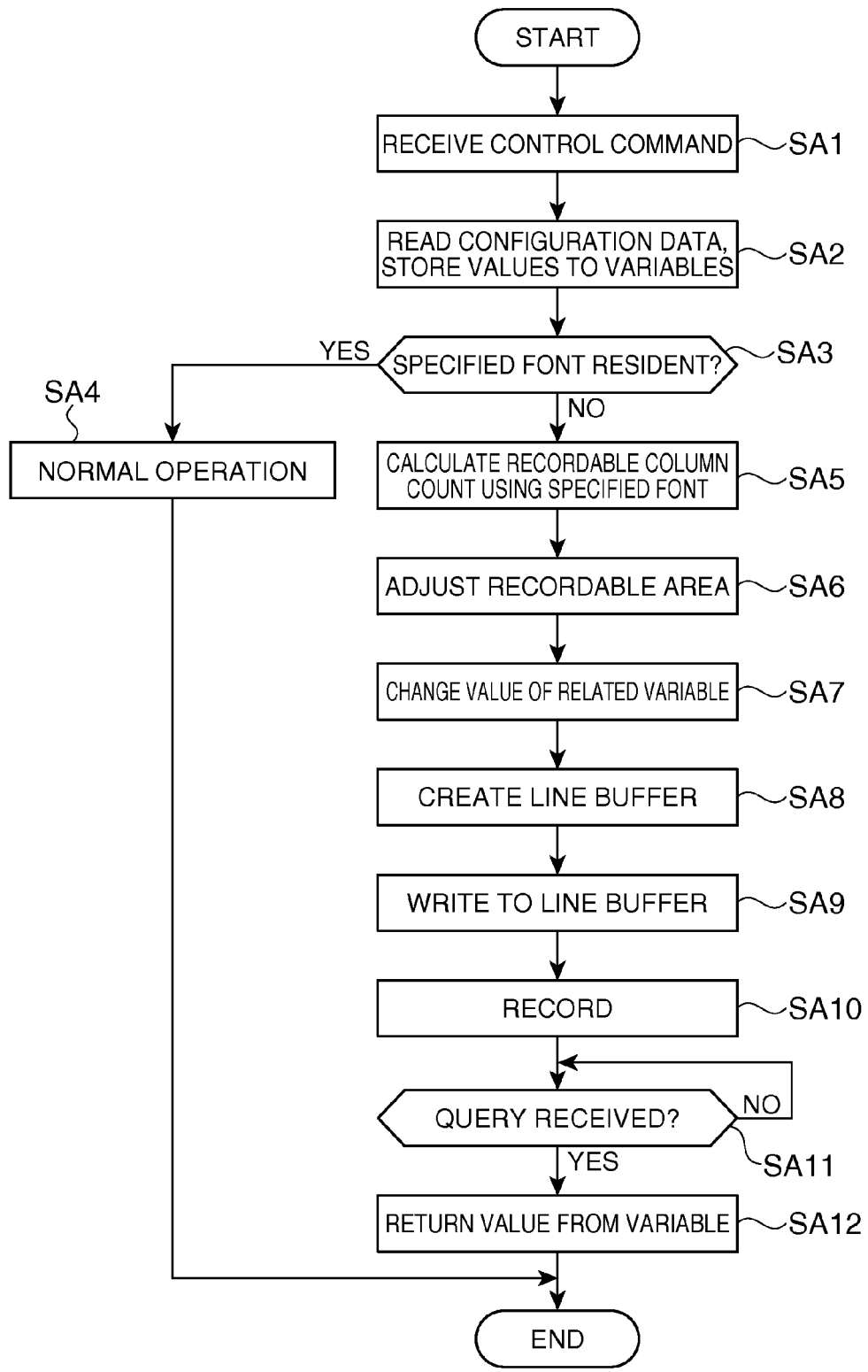
FIG. 5 is a flow chart of printer operation.

FIG. 5 is a flow chart of printer 11 operation.

First, the recording controller 37 of the controller 30 of the printer 11 receives a command group CG containing a font command FC specifying font A' and a string recording command MC (step SA1). When this command group CG is received, the recording controller 37 reads the setting data 41 stored in the storage unit 35, and stores the values of the settings to corresponding variables defined in the firmware, in preparation for producing a receipt (step SA2).

The process of storing values for settings contained in the setting data 41 to variables defined by a program is, more specifically, a process of writing the values for the settings to corresponding addresses in a working area (temporary storage area) in RAM, for example, and is a process of "storing values related to settings written in setting data to a temporary storage area." By storing settings to variables, the recording controller 37 can execute processes related to producing receipts based on the settings. More particularly in this example, the value related to the recordable area (400 dots in this example) is stored to variable H1 in step SA2.

Next, the recording controller 37 determines if the font specified by the font command FC is the font A resident in the printer 11 (step SA3). If the specified font is font A (step SA3 returns YES), the recording controller 37 executes the recording process as usual using the font A table 40 (step SA4).

However, if the specified font is not font A, the recording controller 37 must record the characters by substituting the resident font A. Therefore, if the recording controller 37 determines in step SA3 that the font specified by the font command FC is not the font A resident in the printer 11 (step SA3 returns NO), the recording controller 37 calculates what the recordable column count would be if the characters were recorded using the font specified by the font command FC (step SA5).

Operation in step SA5 is described more specifically below.

As described above, the recordable column count is determined by the set size of the recordable column count and the width of the font data for the characters. Because the value set for the recordable area is 400 dots, and the width of the font A' specified by the font command FC is 13 dots, 400/13=30.7, and the recordable column count calculated by the recording controller 37 in step SA5 is 30 columns. In other words, the host computer 10 commanded recording a string assuming a recordable column count of 30, and the string must therefore be recorded with this recordable column count.

Note that when information identifying the width of the font A' is contained in the font command FC, the recording controller 37 can acquire the width of the font A' based on this information; if information identifying the width of the font A' was previously stored, the font width can be acquired from the stored information; or the information could be acquired by communicating according to a specific protocol at a specific timing with the host computer 10. A suitable means of acquiring information identifying the width (size) of the font A' can be thus be used.

Next, the recording controller 37 calculates a setting for the size of a recordable area at which the recordable column count when the characters are recorded on one line using font A equals the recordable column count (30 columns) calculated in step SA5 (step SA6).

More specifically, the width of font A is 12 dots. In order to achieve a recordable column count of 30 columns when the characters are recorded on one line using font A, the size of the recordable area is therefore set to 360 dots (12 dots×30 columns). The width of the line buffer 45 is therefore set to 360 dots, and the maximum number of characters (=recordable column count) in font A for which font data can be written to the line buffer 45 is 30. Based on this, the recording controller 37 calculates the size (setting) of the recordable area in step SA6 by multiplying the width of the font A by the recordable column count calculated in step SA5.

Next, the recording controller 37 changes the value stored in variable H1 to the recordable column count setting calculated in step SA6 (step SA7).

Next, the recording controller 37 creates a line buffer 45 in a specific storage area (step SA8). The width of the line buffer 45 is set based on the setting for the recordable column count after being changed and stored in variable H1. The settings that are actually used to execute processes are thus not the settings written in the setting data 41, but the values stored in corresponding variables by the program.

Next, the recording controller 37 sequentially writes the font A font data for each character in the string to be recorded to the line buffer 45 based on the string recording command MC and the font A table 40 (step SA9), and records the string based on the data stored in the line buffer 45 (step SA10). Because the line buffer 45 is sized to a recordable column count of 30, the string is also recorded so that the recordable column count is 30. More specifically, the recordable column count when recording the characters in font A', and the recordable column count when the characters are recorded in font A, are both 30, and the printout is similar regardless of which font is used for recording.

Next, the recording controller 37 checks if a query about the value of any setting was received from the host computer 10 (step SA11). This query could be issued automatically after recording is completed, or based on an explicit instruction from the user. Queries are also control commands conforming to a specific protocol, and are executed by a control command that requests a response concerning the value of a setting.

If a query about the value of any setting was received from the host computer 10 in step SA11 (step SA11 returns YES), the recording controller 37 executes the next step (step SA12). Note that for simplicity below, the following description assumes that a query about the recordable area was received from the host computer 10 in step SA11.

When a query about the recordable area is received from the host computer 10, the recording controller 37 does not reference the setting data 41, and instead retrieves the value stored in the variable H1 that stores the setting for the recordable area and returns this value as the recordable area setting.

The effect of this is described below. The setting for the recordable area is the value stored in variable H1 that is actually referenced to create the line buffer 45 and in other recording-related processes, and is not the value stored in the setting data 41. By responding with the value stored in variable H1 when a query about the recordable area is received from the host computer 10, and not responding with the value stored in the setting data 41 as in the related art, the value that is actually used as a result of changing the setting for the recordable area based on the content of the control command can be appropriately returned in response to the query.

As described above, the printer 11 in this embodiment of the invention has a storage unit 35 that stores setting data 41 containing values for settings related to recording on thermal roll paper 24, and a recording controller 37. The recording controller 37 stores values for settings contained in the setting data 41 to variables defined by the program in a temporary storage area, and reads the values from the variables to record on the thermal roll paper 24 based on control commands received from the host computer 10. When a control command is received from the host computer 10, the recording controller 37 changes the value for a specific setting stored to a variable based on the content of the control command, records using the changed value for that specific setting, and returns the changed value retrieved from the variable when a query about the setting for which the value was changed is received from the host computer 10.

More specifically, when a control command is received from the host computer 10, the recording controller 37 changes the setting related to the recordable area that is stored in the variable H1 according to the content of the control command, uses the changed setting for the recordable area to record in the recordable area, and returns the changed setting for the recordable area retrieved from the variable H1 when a query about the recordable area is received from the host computer 10.

With this configuration, because the setting for the recordable area is stored in a specific way, the recording controller 37 of the printer 11 returns the temporarily changed value of the recordable area setting when the recordable area (setting) has been temporarily changed and a query concerning the recordable area is then received from the host computer 10, and the value of the recordable area that is actually used when recording can be appropriately returned.

When a control command for recording one line of text is received from the host computer 10, the recording controller 37 in this embodiment of the invention changes the value of the recordable area setting stored in the variable H1 so that the recordable column count of characters recorded on one line goes to a specific value according to the content of the control command, records in the recordable area with reference to the changed value for of the recordable area setting, and when a query about the recordable area is received from the host computer 10, returns the changed recordable area setting stored in variable H1.

More specifically, when a command group CG is received from the host computer 10, the recording controller 37 changes the setting of the recordable area stored in the variable H1 based on the font specified by the font command FC in the command group CG so that the recordable column count when characters are recorded on one line in the specified font (font A' in the above example), and the recordable column count when the characters are recorded on one line using a font resident in the printer 11 (font A in the above example), are the same; records to the recordable area based on the changed setting for the recordable area; and when a query about the recordable area is received from the host computer 10, returns the changed setting for the recordable area.

When the recordable area setting stored in the variable H1 is temporarily changed in order to adjust the recordable column count, the recording controller 37 in this embodiment returns the temporarily changed setting for the recordable area to the host computer 10 when a query about the recordable area is received from the host computer 10, and can therefore appropriately return the recordable area setting that was actually.

The foregoing embodiment simply describes a preferred embodiment of the invention, and can be varied and adapted in many ways without departing from the scope of the accompanying claims.

More specifically, the recordable area is used as one example of a setting in the embodiment described above, but the setting is not limited to the recordable area, and could be the recording speed, recording density, or left and right margins, for example. For example, in an implementation that temporarily changes the left margin setting according to the content of a control command received from the host computer 10, the recording controller 37 returns the left margin setting after the setting is temporarily changed when queried about the left margin setting by the host computer 10. This operation has an effect equivalent to the effect described above.

The printer 11 is also described above as a thermal recording device, but the recording method is not limited thereto and the invention can be used with inkjet printers, dot impact printers, and other types of printers.

The function blocks shown in FIG. 1 can be achieved in many ways by the cooperation of hardware and software, and do not suggest a specific hardware configuration. Functions of the function blocks of the printer 11 can also be rendered by separate devices externally connected to the printer 11. The printer 11 can also execute operations including the operation described in the flow chart in FIG. 5 by running a program stored on an externally connected storage medium.

Embodiment 2

Figure 6:
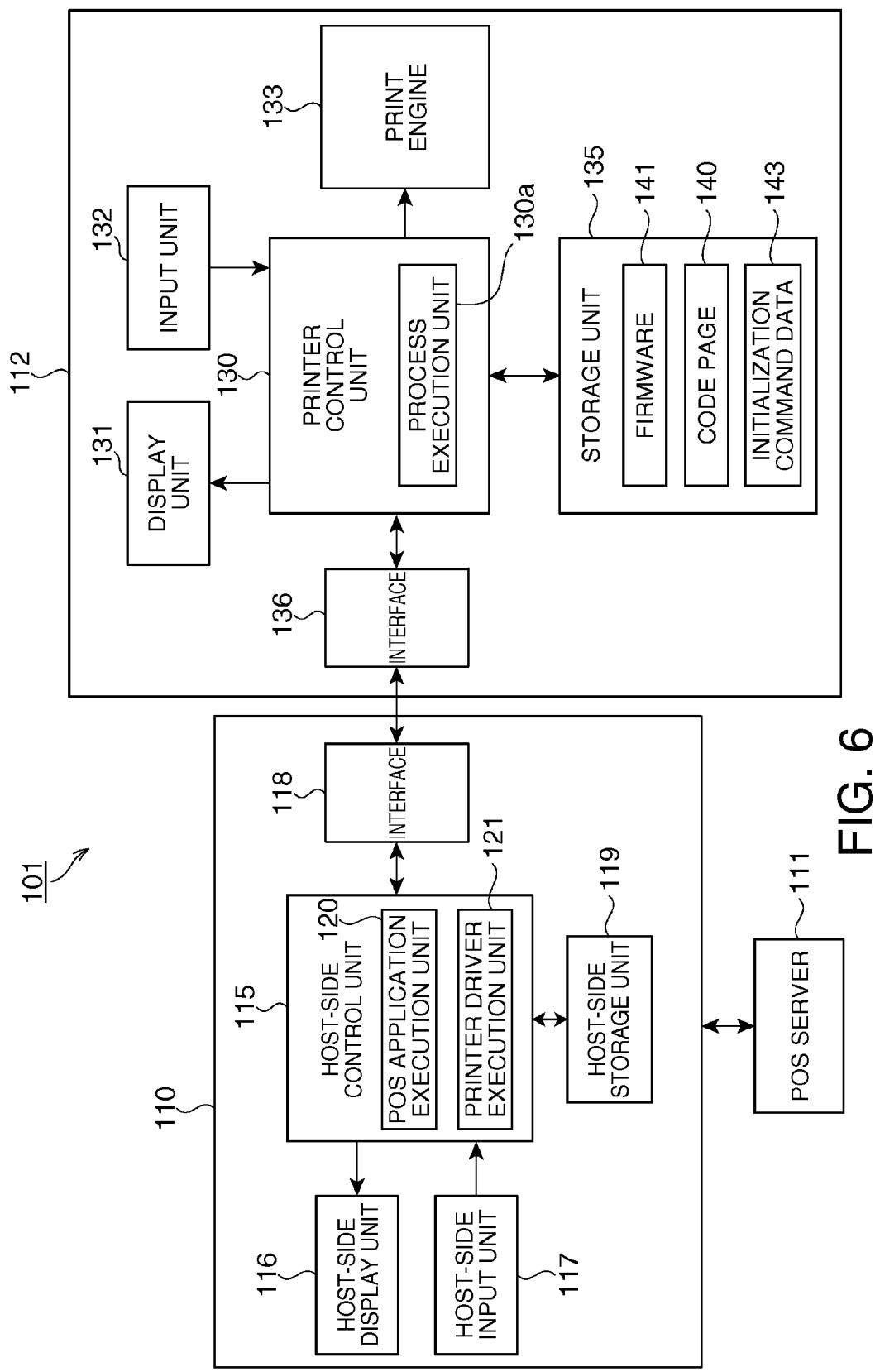
FIG. 6 is a block diagram showing the functional configuration of a recording system according to a second embodiment of the invention.

FIG. 6 is a block diagram showing the functional configuration of a recording system 101 according to this embodiment of the invention.

The recording system 101 is used in retail stores such as supermarkets and convenience stores, and is a system having at least a function for issuing receipts for bill and purchase payments by customers visiting the store, and as shown in FIG. 6 includes a host computer 110 (control device), POS server 111, and printer 112 (recording device).

The POS server 111 is connected to and communicates with the host computer 110 over a network, and stores data for information required to print receipts, including product code, name, and price information for products sold by the store, in a database. In order to issue a receipt, the host computer 110 references the database stored on the POS server 111 as needed to acquire the required information.

The host computer 110 has a host-side control unit 115, host-side display unit 116, host-side input unit 117, interface 118, and host-side storage unit 119.

The host-side control unit 115 centrally controls other parts of the host computer 110, and includes a CPU as an operating unit, ROM that nonvolatilely stores the basic control program run by the CPU and data related to the basic control program, RAM that temporarily stores programs run by the CPU and data related to the programs, and other peripheral circuits.

The control unit 115 includes a POS application execution unit 120 and a printer driver execution unit 121 as further described below.

The host-side display unit 116 is a display panel such as an LCD panel or organic EL panel, and displays information on the display panel as controlled by the host-side control unit 115.

The host-side input unit 117 is connected to input devices such as a keyboard, mouse, barcode reader, and card reader, and outputs output signals from these input devices to the host-side control unit 115. The barcode reader is used to read barcodes from product packaging, for example, and the card reader is used to read information recorded on credit cards and frequent customer cards, for example. Information acquired using the barcode reader, card reader, or other input device is used in the receipt printing process.

The interface 118 communicates with the printer 112 as controlled by the host-side control unit 115 according to a specific communication protocol.

The host-side storage unit 119 rewritably stores data, and includes a storage device such as a hard disk drive or EEPROM.

The printer 112 is a thermal printer that conveys thermal paper wound in a roll (thermal roll paper) using a platen roller, records images by applying heat to the recording surface of the thermal roll paper using a line thermal head with heating elements, and then cuts the thermal roll paper at a specific position, producing a receipt.

As shown in FIG. 6, the printer 112 has a printer control unit 130 (control unit), a display unit 131, an input unit 132, a print engine 133, a storage unit 135, and an interface 136.

The control unit 130 centrally controls other parts of the printer 112, and includes a CPU, RAM, ROM, and other peripheral circuits. The control unit 130 also has a process execution unit 130a as further described below.

The display unit 131 has LEDs or a display panel such as an LCD panel or organic EL panel for displaying information such as the operating status of the printer 112, and displays information on the display panel, or turns particular LEDs on/off, as controlled by the control unit 130.

The input unit 132 is connected to operating switches disposed to the printer 112, detects operation of the switches, and outputs corresponding operating signals to the control unit 130.

The print engine 133 drives the foregoing line thermal head, a paper feed motor for driving the platen roller that conveys the thermal roll paper, and a cutter drive motor that drives the cutter of a paper cutter mechanism, while monitoring the output values of various sensors as controlled by the control unit 130 to record images on the thermal roll paper, cut the thermal roll paper after image recording, and thereby issue a receipt.

The storage unit 135 is an EEPROM or other type of memory device, and stores data rewritably. In addition to storing firmware for controlling printer 112 operation, the storage unit 135 also stores a code page 140 and initialization command data 143 (both described below).

The interface 136 communicates with the host computer 110 as controlled by the control unit 130 according to a specific communication protocol.

Figure 7:
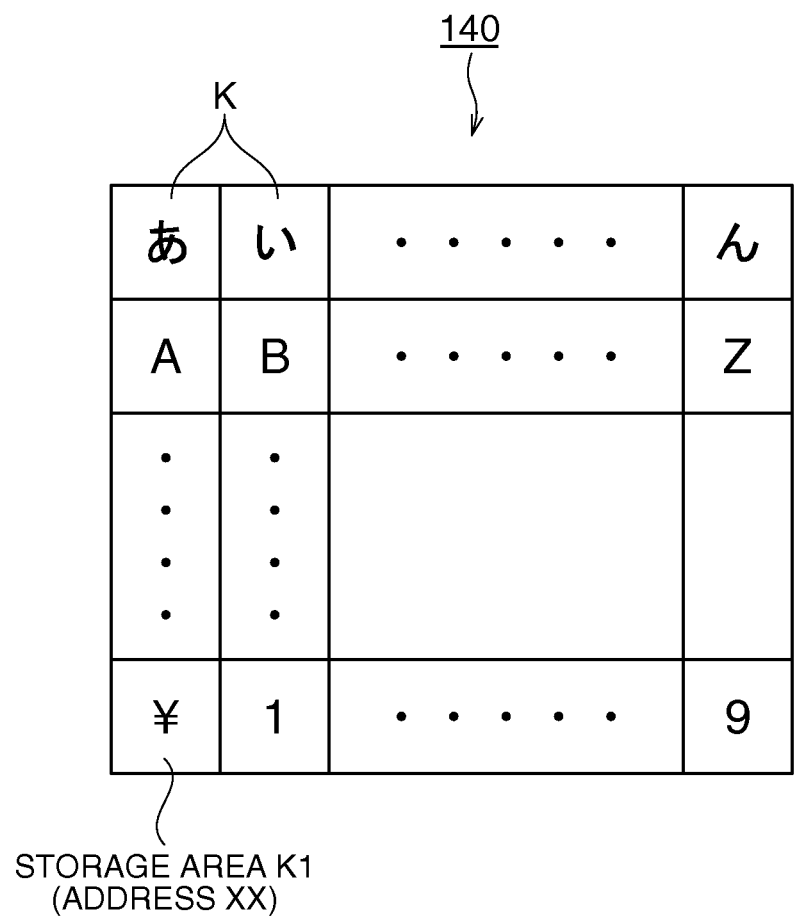
FIG. 7 shows an example of a code page.

FIG. 7 schematically describes the content of the code page 140.

The code page 140 is a table that stores sets of font data for the characters that can be recorded by the printer 112. The font data is the actual data (such as bitmap font data or scalable font data) expressing the characters in a format that can be recorded on the recording medium.

As shown in FIG. 7, the code page 140 has a plurality of storage areas K formed by segmenting the storage space of the code page 140, and font data for one character can be stored in one storage area K. An address that uniquely identifies each storage area is assigned to each storage area K, and one storage area K can be identified by specifying one address.

In this embodiment of the invention as shown in FIG. 7, font data for the Japanese currency symbol ¥ is stored in storage area K1 at address XX in the group of storage areas k formed in the code page 140. The data stored in this storage area K1 is further described below.

The code page 140 is used after being written to a temporary storage area in RAM, for example, by the initialization process described below.

The basic operation of the recording system 101 when producing a receipt is described next by describing the POS application execution unit 120 and printer driver execution unit 121.

By executing a POS application that is preinstalled to the host computer 110, the POS application execution unit 120 accesses the POS server 111 as needed during each transaction to acquire the information to be printed on the receipt, including, for example, information identifying the products purchased in the transaction, information indicating product prices, and information indicating the total purchase amount. Based on the acquired information, the POS application execution unit 120 also generates and outputs recording data for the image to be recorded on the receipt to the printer driver execution unit 121. The images to be recorded on the receipt include text-related images such as images related to characters indicating product names, and images related to characters indicating prices. In the recording data generated by the POS application execution unit 120, these characters are expressed by specific character codes, such as ASCII or Unicode codes.

By running a printer driver preinstalled in the host computer 110, the printer driver execution unit 121 generates recording commands according to the command language of the printer 112 based on the recording data input from the POS application execution unit 120, and outputs to the printer 112 control unit 130. The recording commands include commands causing the paper feed mechanism to convey the thermal roll paper, commands for driving the line thermal head, commands causing the cutter mechanism to cut the thermal roll paper, and other commands that cause the printer 112 to produce a receipt.

The recording commands are input to the control unit 130, which controls parts of the printer 112 based on the input recording commands to produce a receipt.

Character code processing by the printer driver execution unit 121 is described next.

When recording data is input from the POS application execution unit 120, the printer driver execution unit 121 interprets the recording data and extracts the character codes contained in the recording data.

Next, the printer driver execution unit 121 converts the extracted character codes to address information. This address information is information indicating the address of the storage area K storing the font data for the characters of the extracted character codes. Note that a table correlating the character codes and address information is stored in the storage unit 119, and the printer driver execution unit 121 references this table to convert character codes to address information. For example, referring to FIG. 7, for the character code identifying the Japanese currency symbol ¥, the printer driver execution unit 121 converts the character code to address information indicating address XX. After converting the character codes to address information, the printer driver execution unit 121 outputs the recording commands to the printer 112.

When recording commands are input as described above, the printer 112 control unit 130 controls the print engine 133 based on the recording commands to produce a receipt. The printer control unit 130 therefore determines the storage area K where the character to be recorded on the receipt is stored in the code page 140 written to RAM or other temporary storage area based on the address information, and records an image of the character based on the font data stored at the identified storage area K. In this example, the printer control unit 130 identifies storage area K1 in the code page 140 based on address information identifying address XX, gets the font data stored at the identified storage area K1, writes the font data to a specific image buffer, controls the drive circuit for driving the line thermal head based on the buffered data, and records an image of the currency symbol on thermal roll paper.

The initialization command data 143 is described next.

Figure 8:
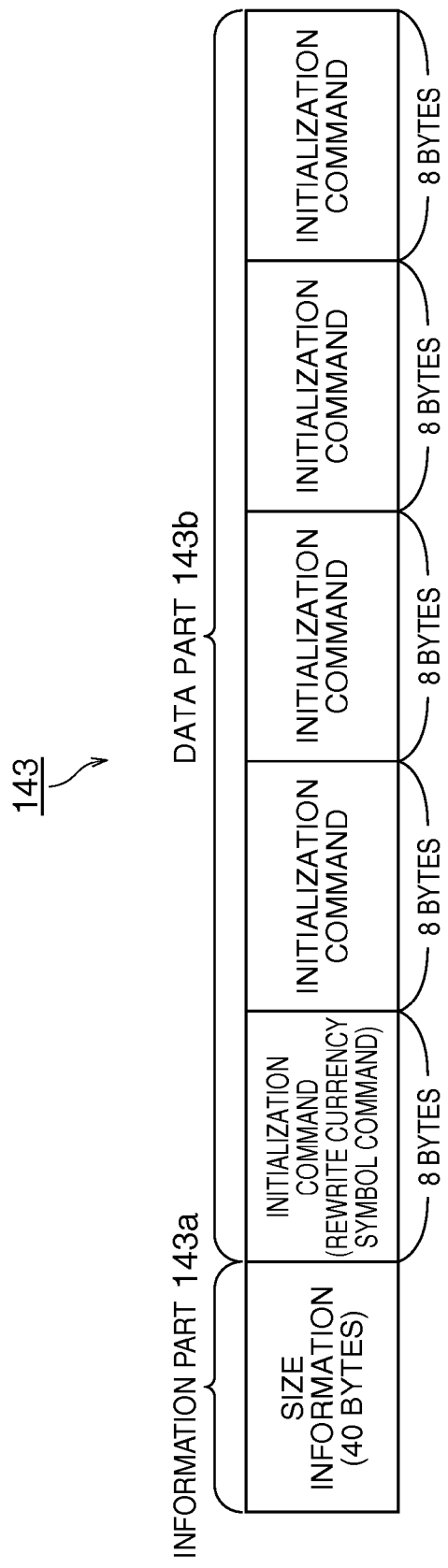
FIG. 8 an example of initialization command data.

FIG. 8 schematically describes the initialization command data 143 stored in the storage unit 135.

The initialization command data 143 is data storing a list of commands that must be executed when the power turns on or after a reset. A reset refers to returning the printer 112 to the initial operating state when the printer 112 power is on without turning the power off, and the reset process starts in this embodiment when a reset command is input from the host computer 110. After resetting, processes can be executed in the same way as after the power turns on.

An initialization process is a process that is preconfigured as a process to be executed after the power turns on or a reset is invoked, and may include initialization processes required to reset the CPU or RAM, initialization processes required by specific programs, and processes related to initializing mechanical operations by the print engine 133.

The initialization command data 143 stores a list of process commands that must be executed ("initialization commands" below) during the initialization process in addition to the processes executed by functions of the firmware 141 as processes that must be executed to operate the printer 112 normally. In other words, when one command is registered in the initialization command data 143, the printer 112 executes this one command in addition to the initialization processes performed by a function of the firmware 141 during the initialization process.

As shown in FIG. 8, the initialization command data 143 includes an information part 143a and a data part 143b.

Data identifying the initialization commands is consecutively written in the data part 143b in the order the commands are executed. In the example shown in FIG. 8, the data part 143b contains consecutive data for five 8-byte initialization commands in the order the commands run.

Size information, which is information indicating the size of the data part 143b, is written to the information part 143a. In the example shown in FIG. 8, the size of the data part 143b is 40 bytes (8 bytes×5), and size information indicating the size of the data part 143b is 40 bytes is therefore written to the information part 143a.

Note that the address of the beginning of the storage area where the information part 143a and data part 143b are stored is constant.

Because data identifying the initialization commands is written consecutively in the execution order to the data part 143b of the initialization command data 143 in this embodiment, the storage area occupied by the data part 143b is minimized, and there is no need to store information for managing the order in which the commands are executed. In addition, the information part 143*a* of the initialization command data 143 stores the smallest amount of information required to identify the area where the data part 143*b* is stored in the storage area, that is, stores information indicating the size of the data part 143*b*. The size of the information part 143*a* is therefore small, and the storage unit 135 can be used efficiently.

The initialization command data 143 could conceivably be stored in a relational database to simplify managing the initialization commands written in the initialization command data 143. However, this configuration also requires storing information for managing the relational database (such as the address of each field in the storage area, and information about the relationships between the data stored in each field), unnecessarily requires reserving a corresponding storage area, and thus creates problems with efficient use of the storage unit 135.

The initialization command data 143 is data generated for the following purpose.

When printers, such as simple printers with a few functions and advanced printers with more advanced functions, share the same basic platform and the same basic software is used across that platform, a large portion of the processes executed in the initialization process is the same in different printers. In this situation, individually programming and installing firmware 141 to perform different initialization processes on different printers complicates development and increases the cost of development.

In this embodiment of the invention, initialization command data 143 is previously stored in the storage unit 135, the firmware 141 is programmed to execute as functions of the firmware 141 processes that are performed during the initialization process and are common to different printer models, and commands related to processes that are not common to different models are written in the initialization command data 143 specific to each printer. As a result, at least the program related to firmware 141 initialization processes can be shared between different models of printers, the ease of development can be improved compared with developing separate programs, and the cost of development can be reduced.

The processes executed as part of the initialization process may also differ in the same model of printer depending upon the destination market of the printer. This embodiment of the invention is therefore preconfigured to store the initialization command data 143 in the storage unit 135, the firmware is programmed to execute as functions of the firmware processes that are common to all market destinations, and processes that differ according to the destination models are written in the initialization command data 143 specific to each printer. As a result, at least the program related to firmware initialization processes can be shared regardless of the destination, the ease of development can be improved compared with developing separate programs for different destinations, and the cost of development can be reduced.

In this embodiment of the invention a rewrite currency symbol command TC (destination-specific command) is written in the initialization command data 143. In the example shown in FIG. 8, the initialization command written first in the group of initialization commands written in the initialization command data 143 is the rewrite currency symbol command TC.

The rewrite currency symbol command TC is a command that writes the code page 140 to RAM or other temporary storage, and then overwrites the font data (changes the font data) for the currency symbol in the code page 140 according to the destination (a concept included in changing the content of the code page to content for a specific market destination, and changing specific font data to font data corresponding to the destination).

More specifically, the currency symbol for Japan is ¥, the currency symbol for North America is $, and the currency symbol thus differs according to the market. The process related to the rewrite currency symbol command TC is a process that writes the code page 140 to RAM or other temporary storage area, and writes the font data for the currency symbol used in the destination market to the storage area K of the code page 140 that is predefined as the storage area K where the font data for the currency symbol is stored (storage area K1 in the example in FIG. 7).

For example, the rewrite currency symbol command TC in a printer 112 intended for the Japanese market commands writing the code page 140 to a temporary storage area, and overwriting storage area K1 in the code page 140 with font data for the ¥ character (changing the font data). Upon reading this command, the printer control unit 130 writes the code page 140 to temporary storage, and overwrites storage area K1 in the code page 140 with the font data for the character ¥ (changes the font data).

Similarly, the rewrite currency symbol command TC in a printer 112 intended for the North American market commands writing the code page 140 to a temporary storage area, and overwriting storage area K1 in the code page 140 with font data for the $ character. Upon reading this command, the printer control unit 130 writes the code page 140 to temporary storage, and overwrites storage area K1 in the code page 140 with the font data for the character $ (changes the font data).

The operation of the process execution unit 130*a* of the printer control unit 130 is described next.

Figure 9:
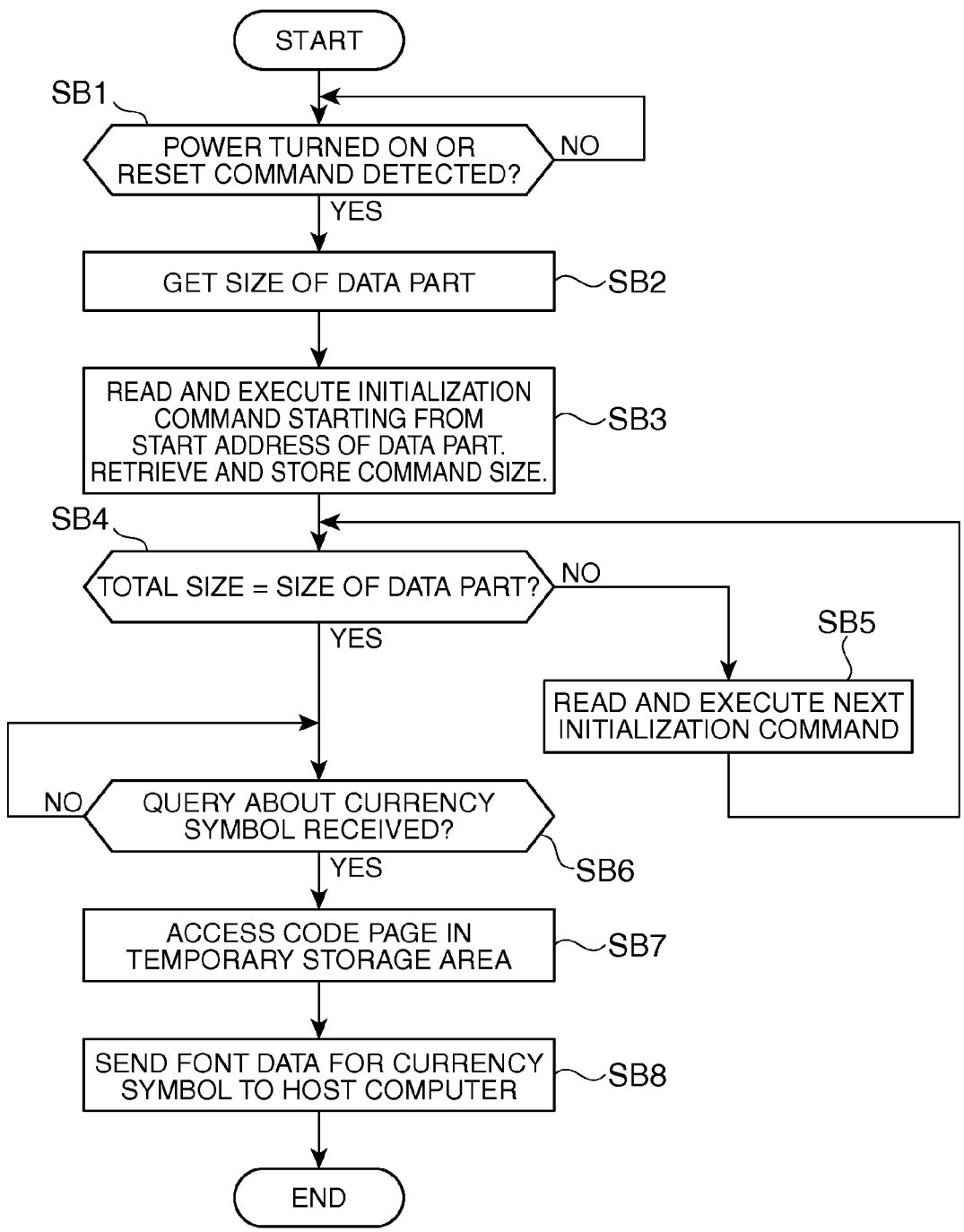
FIG. 9 is a flow chart of printer operation.

FIG. 9 is a flow chart of the operation of the process execution unit 130*a*.

The function of the process execution unit 130*a* is rendered by the cooperation of hardware and software, such as a CPU reading and running a program.

The process execution unit 130*a* first checks if the power was turned on or a reset command was asserted (step SB1). If the power was turned on or a reset command was asserted (step SB1 returns YES), the process execution unit 130*a* accesses the information part 143*a* of the initialization command data 143 and gets the size of the data part 143*b* (step SB2).

Next, the process execution unit 130*a* accesses the start address of the data part 143*b*, and reads and executes the one initialization command written immediately after the start address (step SB3). The process execution unit 130*a* also retrieves the size of the data identifying the read initialization command, and stores this size information at a specific address in RAM. Thereafter, the process execution unit 130*a* gets and adds the size of the data identifying the initialization command that was read to the size information stored in RAM each time an initialization command is read. The total size of the data identifying the initialization commands that were read is referred to as the "total size" below. The information indicating the size stored at the specific address in RAM indicates the total size.

After the initialization command written immediately following the start address of the data part 143*b* is read in step SB3, the process execution unit 130*a* determines if the total size equals the size of the data part 143*b* acquired in step SB2 (step SB4).

That the total size equals the size of the data part 143*b* acquired in step SB2 means that all initialization commands written in the data part 143*b* have been read and executed.

If in step SB4 the total size does not equal the size of the data part 143*b* acquired in step SB2 (step SB4 returns NO), the process execution unit 130*a* reads and executes the initialization command written next after the initialization command that was just read and run (step SB5), and then returns to step SB4.

If in step SB4 the total size equals the size of the data part 143*b* acquired in step SB2, in other words, the initialization processes related to all of the initialization commands written in the initialization command data 143 have been completed for each initialization command (step SB4 returns YES), the process execution unit 130*a* goes to step SB6.

As described above, a rewrite currency symbol command TC is written in the initialization command data 143 in this embodiment. Therefore, when step SB4 returns YES, the code page 140 has been written to temporary storage, and the font data stored in storage area K1 in the code page 140 has been changed to the font data for the currency symbol used in the destination market.

In step SB6 the process execution unit 130*a* monitors whether or not a query concerning the currency symbol was received from the host computer 110. More specifically, the process execution unit 130*a* checks if a query asking for the registered currency symbol was received after address information for address XX is specified and font data for a character is registered at that address.

This embodiment of the invention adds new functions to the host computer 110 for sending this query to the printer at an appropriate timing after the initialization process ends, and displaying an image of the currency symbol that is actually registered on the display panel of the host-side display unit 116 based on the response to this query. The user can use these functions to reliably confirm if the currency symbol is appropriate to the market before actually printing with the printer 112.

If a currency symbol query from the host computer 110 is received (step SB6 returns YES), the process execution unit 130*a* accesses the code page 140 written to the temporary storage area, that is, accesses the code page 140 after the currency symbol was changed to match the destination, instead of accessing the code page 140 stored in the storage unit 135 (step SB7). The process execution unit 130*a* then gets the font data for the currency symbol from storage area K1 at address XX in the code page 140, and sends this font data to the host computer 110 using a specific protocol (step SB8).

As a result, when a query about the currency symbol is received from the host computer 110, the process execution unit 130*a* responds to the query based on the updated content of the code page 140 written to a temporary storage area, that is, based on the content of the code page 140 that is actually used. An appropriate response based on the code page 140 being used is therefore possible.

As described above, a printer 112 according to this embodiment of the invention has initialization command data 143 containing one or a plurality of initialization commands for executing initialization processes that should be executed when the power turns on or a reset command is asserted, and a storage unit 135 that stores a code page 140 containing font data. The initialization commands include a rewrite currency symbol command TC that writes the code page 140 to temporary storage and changes the content of the code page 140 to content for a specific destination. When the power turns on or a reset command is asserted, the process execution unit 130*a* sequentially executes the initialization commands based on the initialization command data 143, and when a query related to the code page 140 is received from the host computer 110, responds to the query based on the code page 140 that is stored in temporary memory and contains content that was changed for the specific destination.

As a result, when a query about the code page 140 is received from the host computer 110, the printer 112 in this implementation responds to the query based on the updated content of the code page 140 written to temporary storage, that is, based on the content of the code page 140 that is actually used, and can therefore respond appropriately based on the code page 140 actually being used.

The rewrite currency symbol command TC written in the initialization command data 143 in this embodiment of the invention contains an instruction that changes specific font data related to the currency symbol in the font data stored in the code page 140 to font data for a specific destination. When a query about the currency symbol (specific font data) is then received from the host computer 110, the process execution unit 130*a* references the code page 140 written to temporary storage, and responds to the query based on the font data after being updated for the destination.

Because the printer 112 in this implementation responds to queries about specific font data based on the font data after it was changed in the initialization process according to the destination, the printer 112 can respond appropriately based on the content of the font data that is actually used.

The initialization command data 143 in this embodiment of the invention includes a data part 143*b* at a specific address in the storage unit 135 where data identifying specific initialization commands is written consecutively in the order the commands are executed, and an information part 143*a* containing information identifying the size of the data part 143*b* from the specific address.

Because data identifying the initialization commands is written continuously in the order the commands are executed in the data part 143*b* of the initialization command data 143, the storage area occupied by the data part 143*b* is minimized and there is no need to store information for managing the order in which the commands are executed. In addition, the information part 143*a* of the initialization command data 143 stores the smallest amount of information required to identify the area where the data part 143*b* is stored in the storage area, that is, stores information indicating the size of the data part 143*b*. The size of the information part 143*a* is therefore small, and the storage unit 135 can be used efficiently.

A preferred embodiment of the invention is described above, and various modifications and improvements that are possible within the scope of the invention will be obvious to one with ordinary skill in the related art.

For example, the foregoing describes changing the font data for the currency symbol as specific examples of changing the content of the code page to content for a specific market destination, and changing specific font data to font data corresponding to the destination, but the invention is not so limited. More specifically, the invention can be broadly applied to recording devices that modify a code page 140 according to the destination in an initialization process that uses the initialization command data 143.

The printer 112 connected to the host computer 110 in this embodiment is a thermal printer, but the type of recording method is not so limited and could be an inkjet or dot impact recording method, for example.

The function blocks shown in FIG. 6 can be achieved in many ways by the cooperation of hardware and software, and do not suggest a specific hardware configuration. Functions of the function blocks of the printer 112 can also be rendered by separate devices externally connected to the printer 112. The printer 112 can also execute operations including the operation described in the flowchart in FIG. 9 by running a program stored on an externally connected storage medium.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A recording device to record on a thermal roll paper comprising:
   a storage configured to store second font data corresponding to a second font in a second font table;
   an interface configured to receive a command group from a control device;
   a receiving buffer configured to store the command group;
   a controller configured to read the command group from the receiving buffer, the command group comprising a font command and a character string, wherein the font command specifies a first font;
   wherein the controller reads a character in the character string from the receiving buffer, references the second font table for the second font, and converts the character to the second font data in the second font table, and
   wherein the controller is further configured to calculate a column count using the first font, and record the second font data of the second font within the calculated column count of the first font.

2. The recording device of claim 1, wherein a recording result prepared using the second font is similar to a recording result prepared using the first font.

3. The recording device of claim 1, wherein the character is expressed by a specific character code.

4. The recording device of claim 1, wherein the column count is a quotient of a first value and a width of the first font data,
   wherein the first value is a first recordable area.

5. The recording device of claim 1, wherein the controller is configured:
   to calculate a second value by multiplying the column count of the first font by a width of the second font data, wherein the second value is a second recordable area.

6. The recording device of claim 5, wherein the interface sends the second value in response to a query received from the control device.

7. A method of controlling a printer comprising:
   receiving a command group at an interface of the printer,
   storing a control command contained in the command group in a storage of the printer, the control command instructing recording a specific string using a specific font;
   reading a font command and a string recording command included in the stored control command at a controller of the printer,
   sequentially acquiring a character specified by the string recording command,
   referencing a font table including font data corresponding to the specific font,
   sequentially converting the acquired character to the font data, and writing the font data to a line buffer; and
   recording the specific string, on a recording medium, using the font data,
   wherein the buffer includes a predetermined height and a predetermined width, the width of the line buffer being determined based on a value of a setting relating to a recordable area of the printer and the height of the buffer being determined by the height of the font data.

8. The method of controlling a printer of claim 7, wherein the string recording command includes one or more parameters and at least one string.

9. The method of claim 8, wherein the at least one string includes a combination of characters expressed by a specific character code.

10. The method of controlling a printer of claim 9, wherein the specific character code is in ASCII format.

11. The method of controlling a printer of claim 7, further including clearing the line buffer and writing the font data from the beginning of the line buffer in an event the font data exceeds the width of the line buffer.

* * * * *